United States Patent
Makis et al.

(10) Patent No.: US 11,103,999 B2
(45) Date of Patent: Aug. 31, 2021

(54) METHOD FOR OPERATING A WORKPIECE MACHINING SYSTEM AND WORKPIECE MACHINING SYSTEM

(71) Applicant: SW Automation GmbH, Tettnang (DE)

(72) Inventors: Sven Makis, Langenargen (DE); Metin Kilic, Efrizweiler (DE)

(73) Assignee: SW AUTOMATION GMBH, Tettnang (DE)

( * ) Notice: Subject to any disclaimer, the term of this patent is extended or adjusted under 35 U.S.C. 154(b) by 512 days.

(21) Appl. No.: 16/027,624

(22) Filed: Jul. 5, 2018

(65) Prior Publication Data

US 2019/0015983 A1    Jan. 17, 2019

(30) Foreign Application Priority Data

Jul. 13, 2017   (DE) .................... 10 2017 115 833.2

(51) Int. Cl.
    *G05B 19/04*    (2006.01)
    *G05B 19/18*    (2006.01)
    (Continued)

(52) U.S. Cl.
    CPC ............ *B25J 9/1666* (2013.01); *B23Q 15/14* (2013.01); *B25J 11/005* (2013.01); *G05B 19/042* (2013.01)

(58) Field of Classification Search
    CPC ....... B23Q 15/14; B25J 11/005; B25J 9/1666; B29C 64/153; B29C 64/393; B33Y 10/00;
    (Continued)

(56) References Cited

U.S. PATENT DOCUMENTS

| | | | | |
|---|---|---|---|---|
| 5,970,688 A | * | 10/1999 | Nyiendo | ................. B65B 5/045 |
| | | | | 53/381.6 |
| 6,322,119 B1 | * | 11/2001 | Schmidt | .................... B25J 5/02 |
| | | | | 294/103.1 |
| 2003/0198551 A1 | * | 10/2003 | Schmidt | ..................... B25J 9/08 |
| | | | | 414/749.1 |

(Continued)

FOREIGN PATENT DOCUMENTS

| | | |
|---|---|---|
| DE | 10 2007 029 233 B3 | 8/2008 |
| DE | 10 2008 050 967 A1 | 4/2009 |

(Continued)

OTHER PUBLICATIONS

European Search report for corresponding European application No. 18177504.0-1204, dated Nov. 21, 2018.
(Continued)

*Primary Examiner* — Harry Y Oh
(74) *Attorney, Agent, or Firm* — Hamre, Schumann, Mueller & Larson, P.C.

(57) ABSTRACT

A workpiece machining system with at least one machine tool, which has at least one loading and unloading opening and at least one safety area, which has at least one loading and unloading device, which has at least one carrier and at least one loading and unloading device which can be moved along the carrier and, in particular, one that is multi-axis, where the loading and unloading device can be arranged in front of at least one of the at least one machine tool in a loading and unloading position and at least one gripping arm of the loading and unloading device can be moved from a displacement position, in which the gripping arm is arranged substantially above the carrier, into an engagement position, and with at least one safety device for monitoring the Security area of the at least one machine tool.

12 Claims, 3 Drawing Sheets

(51) Int. Cl.
*B25J 9/16* (2006.01)
*B23Q 15/14* (2006.01)
*B25J 11/00* (2006.01)
*G05B 19/042* (2006.01)

(58) Field of Classification Search
CPC .. B33Y 40/00; G05B 19/042; G05B 19/4099; G05B 2219/35106; G05B 2219/35107; G05B 2219/49021; G05B 2219/49335; Y02P 90/02
See application file for complete search history.

(56) References Cited

U.S. PATENT DOCUMENTS

| | | | | |
|---|---|---|---|---|
| 2006/0130750 A1* | 6/2006 | Ishikawa | ............. | G03D 13/006 118/300 |
| 2012/0059516 A1* | 3/2012 | Lundberg | ............. | B25J 19/005 700/258 |
| 2013/0120547 A1* | 5/2013 | Linnell | ............. | B25J 9/1682 348/61 |
| 2013/0245823 A1* | 9/2013 | Kimura | ............. | B25J 5/02 700/248 |
| 2014/0074291 A1* | 3/2014 | Emoto | ............. | B25J 5/007 700/258 |
| 2016/0157942 A1* | 6/2016 | Gombert | ............. | A61B 34/30 606/130 |

FOREIGN PATENT DOCUMENTS

| | | |
|---|---|---|
| DE | 10 2009 048 863 A1 | 4/2010 |
| DE | 202015004517 U1 | 8/2015 |
| DE | 10 2015 105 799 A1 | 10/2015 |

OTHER PUBLICATIONS

German Search report for corresponding German application 10 2017 0115 833.2 dated Jun. 7, 2018.

* cited by examiner

METHOD FOR OPERATING A WORKPIECE MACHINING SYSTEM AND WORKPIECE MACHINING SYSTEM

CROSS REFERENCE TO RELATED APPLICATIONS

This application claims priority to Germany application DE 10 2017 115 833.2, filed Jul. 13, 2017, which is incorporated by reference in its entirety.

The invention relates to a method for operating a workpiece machining system and a workpiece machining system that can be operated by such a method.

BACKGROUND OF THE INVENTION

A workpiece machining system is known from DE10 2007 029 233 C5.

In these workpiece machining systems, a plurality of machine tools are arranged in series and/or opposite each other and can be supplied by a loading and unloading device. By the loading and unloading device having a carrier and a loading and unloading device that is movable along the carrier, workpieces, tools or the like can be arranged by means of a gripping arm of the loading and unloading device in the respective machine tool or removed therefrom.

In the known workpiece machining systems, the machine tools have a loading and unloading opening for this purpose, which is mechanically closed or released by a hatch. The hatch is part of a safety device and is intended to prevent that the loading and unloading device engages with the gripper arm in the machine tool when an operator access of the machine tool is open. This is intended to prevent possible injury to operating personnel from falling objects.

In the known workpiece machining equipment and the method for operating such workpiece machining equipment, it has been found to be disadvantageous that the opening and reclosing of the hatch is time consuming and maintenance intensive.

SUMMARY OF THE INVENTION

An objective of an embodiment example of the invention is to propose a workpiece machining system and a method for operating such a workpiece machining system, in which the safety device is compact and time and maintenance costs are reduced.

This objective is achieved by a method for operating a workpiece machining system which comprises at least one machine tool, which has at least one loading and unloading opening and at least one safety area, which has at least one loading and unloading device, which has at least one carrier and at least one loading and unloading device which can be moved along the carrier and, in particular, one that is multi-axis, wherein the loading and unloading device can be arranged in front of the at least one machine tool in a loading and unloading position and at least one gripping arm of the loading and unloading device can be moved from a displacement position, in which the gripping arm is arranged substantially above the carrier, into an engagement position, in which the gripping arm protrudes laterally beyond the carrier and in particular is arranged in or above the loading and unloading opening of the machine tool, and includes the at least one safety device for monitoring the Security area of the at least one machine tool which has at least one control unit functionally assigned or attributable to the loading and unloading device and at least one first sensor means arranged in or on the security area, comprising the steps:

a. Possibly deposit and/or define at least one security-relevant event in the control unit;
b. Monitoring at least one safety area of at least one machine tool by the at least one first sensor means of the safety device;
c. Possibly detecting of the position of the loading and unloading device, in particular directly or indirectly, by the control unit;
d. Detecting of an at least one safety-relevant event in the security area of the machine tool, defined, stored or deposited in the control unit, by the at least one first sensor means;
e. Blocking a transfer of the gripping arm of the loading and unloading device from the movement position in the engaged position when the gripping arm is in the movement position and/or transferring the gripping arm of the loading and unloading device from the engagement position in the movement position when the gripper arm is in the engaged position.

The carrier of the loading and unloading device may be, for example, a rail-like guide means. This may be, for example, at ground level or spaced away from the ground supported by supports and at least partially run arranged above the machine tools. The loading and unloading device may be, for example, a multi-axis robot.

The fact that a safety-relevant event in the safety area of the machine tool can be detected by the first sensor means and the control unit and, if so, the gripping arm of the loading and unloading device is returned from the engaged position to the travel position or blocked in the travel position in such way that the gripper arm cannot be moved into the engaged position, it is ensured that no workpieces, tools or the like can pass through the loading and unloading opening of the machine tools and injure an operator. Furthermore, this makes the machine tool without hatch embodiable and at the same time the same safety standard for operators is guaranteed.

Because it is possible to dispense with a hatch on the machine tool which clears or closes the loading and unloading opening, the machine tool can be embodied in a compact manner and the method for operating a workpiece machining system can be designed in a time-optimized manner.

It proves to be advantageous if the at least one security-related event defined, definable, deposited or depositable in the control unit, comprises at least one open functional position of an operator access of the machine tool, a transferring of the operator access from a closed functional position in the open functional position and/or penetration of a body into the safety area of the machine tool.

The fact that the safety-relevant event detects whether an operator access of the machine tool is in an open functional position, i.e. the operator access is open or can be transferred from a closed functional position to the open functional position, means that the method can be implemented in a simplified manner.

Because the safety-relevant event may also include penetration of a body into the safety area of the machine tool, the gripper arm of the loading and unloading device can already be transferred from an engaged position into the travel position, or blocked in the travel position against transfer to the engaged position before an operator opens the operator access of the machine tool. As a result, the safety for operators is further increaseable.

The safety area of the machine tool can, for example, exclusively comprise the machine tool and/or an environment outside the machine tool. The environment may include, for example, an area 5 m and less to the machine tool, in particular 4 m and less to the machine tool, in particular 2 m and less to the machine tool.

It proves to be advantageous if the monitoring of the safety area of the machine tool by the at least one first sensor means of the safety device comprises detecting a closed functional position or open functional position of the operator access of the machine tool and/or detecting an approach of a body to the machine tool, in particular towards the safety area of the machine tool.

In this case, the first sensor means of the safety device may comprise a motion sensor, rangefinder or a toggle switch of the operator access of the machine tool.

In principle, it is conceivable that the blocking of the gripping arm of the loading and unloading device, or the return of the gripping arm of the loading and unloading device from the engagement position to the movement position automatically takes place whenever an arbitrary body penetrates into the security area of the machine tool. However, the method can be optimized if it comprises the following additional steps:
   a. Possibly depositing and/or defining data, in particular body shapes and/or body contours, in the control unit for distinguishing between objects and persons by the control unit.
   b. Detecting an approach of a body to a machine tool, in particular into the safety area of the machine tool, by the at least one first sensor means;
   c. Analysing of the body by the control unit and detecting and recognizing the sensed body as an object or as a person;
   d. Determining a security-relevant event at least if the body comprises a person.

In this case, the control device can determine, by means of the data acquired by the first sensor means, whether the body is an object or a person. If the body concerns a person, the control unit determines that it concerns a safety-relevant event and in such a case blocks a possible transferring of the gripping arm of the loading and unloading device from the movement position in the engagement position, and/or moves the gripping arm of the loading and unloading device from the engagement position in the movement position.

If the detected body concerns an object, it is conceivable that this is not detected by the control unit as a safety-relevant event. This makes it possible to move, for example, by autonomously movable machines and vehicles, workpieces, tools and the like between the machine tools, without this interrupting processing operations.

The method is further time-optimised through this.

Detecting the position of the loading and unloading device can occur basically in any way. It proves to be advantageous if detecting the position the loading and unloading device occurs through at least a second sensor means of the safety device by which at least a distance is detectable from the loading and unloading device to the tool machine where the safety-relevant event is ascertained.

It is necessary for the security of the operating person that it is made sure that the gripping arm of the loading and unloading device is not arranged in or above the loading and unloading opening of the machine tool or protrudes laterally beyond the carrier. If the operating person works on the machine tool, the gripping arm is arranged above the carrier of the loading and unloading device, so that the carrier acts as an additional protection. To further increase the security of the operating person, it is planned for one embodiment of the method that the loading and unloading device, while detecting the at least one safety-relevant event, comprises a moving of the loading and unloading device from the loading and unloading position before the machine tool at which the event safety-relevant is detected.

To prevent a shutdown of the workpiece machining system, it proves to be advantageous if the method comprises the following further steps:
   a. Interruption of machining processes deposited or depositable in the control unit of the loading and unloading device on the machine tool on which the safety-relevant event is detected;
   b. Ascertain whether an at least one machining process deposited or depositable in the control unit of the loading and unloading device on a machine tool in which no safety-relevant event is ascertained, can be continued;
   c. moving the loading and unloading device to a machine tool in which no safety-relevant event is ascertained, and on which a machining process deposited or depositable on the control unit can be executed; or
   d. moving the loading and unloading device to a park position, if a safety-relevant event is ascertained on every machine tool, and/or on which no machining process deposited or depositable on the control unit can be executed;
   e. In particular, check continuously whether the safety-related event detected on the machine tool has ended and whether the interrupted machining process can be continued.

As a result, the machining on a machine tool can be paused or suspended for a short time and it can be continued with the machining, or a feeding of workpieces, tools and the like on another machine tool on which no security-relevant event has been detected. Machining processes are flexibly re-sortable through this, whereby a shutdown of the workpiece machining system is prevented or at least shutdown times are reduced.

In addition, the objective is achieved by a workpiece machining system which is operable in particular according to a method with the abovementioned features, with at least one machine tool which comprises at least one loading and unloading opening and at least one safety area, with at least one loading and unloading device, which has at least one carrier and at least one loading and unloading device movable along the carrier and, in particular, multi-axis, wherein the loading and unloading device can be arranged in front of the at least one machine tool in a loading and unloading position and at least one gripping arm of the loading and unloading device can be moved from a displacement position, in which the gripping arm is arranged substantially above the carrier, into an engagement position, in which the gripping arm protrudes laterally beyond the carrier and in particular is arranged in or above the loading and unloading opening of the machine tool, and with at least one safety device for monitoring the security area of the at least one machine tool which has at least one control unit functionally assigned or attributable to the loading and unloading device and at least one first sensor means arranged in or on the security area.

The carrier of the loading and unloading device can be embodied, for example, rail-like and the loading and unloading device can be moveable, guided on a sledge on the carrier. In addition, the loading and unloading device can comprise a drive means which moves the loading and unloading device on the carrier.

Basically, it is conceivable that the machine tool comprises a hatch in the area of the loading and unloading opening, in addition. However, it proves to be advantageous if the machine tool, without hatch and exclusively, has the loading and unloading opening as access for the loading and unloading.

In addition, the machine tool may include an operator access through which operators have access to the machine tool without further aids.

In one embodiment of the workpiece machining system, the operator access is designed at ground level and the loading and unloading opening arranged on a side facing away from the bottom of the machine tool. The loading and unloading device comprises in such a case a carrier, which is spaced from the ground on supports and moves the loading and unloading device spaced from the ground.

In addition, it proves to be advantageous if the at least one first sensor means of the safety device comprises at least one motion sensor, rangefinder or toggle switch of an operator access of the machine tool.

The position of the loading and unloading device can be easily determined if the safety device comprises at least a second sensor means by which a distance of the loading and unloading device to the machine tool can be detected and which comprises a rangefinder and/or a motor position of a drive of the loading and unloading device.

Further features, details and advantages of the invention will become apparent from the appended patent claims, the drawings and the following description of preferred embodiments of the workpiece machining system and the method for operating a workpiece machining system.

DETAILED DESCRIPTION OF THE INVENTION

Figure 1:
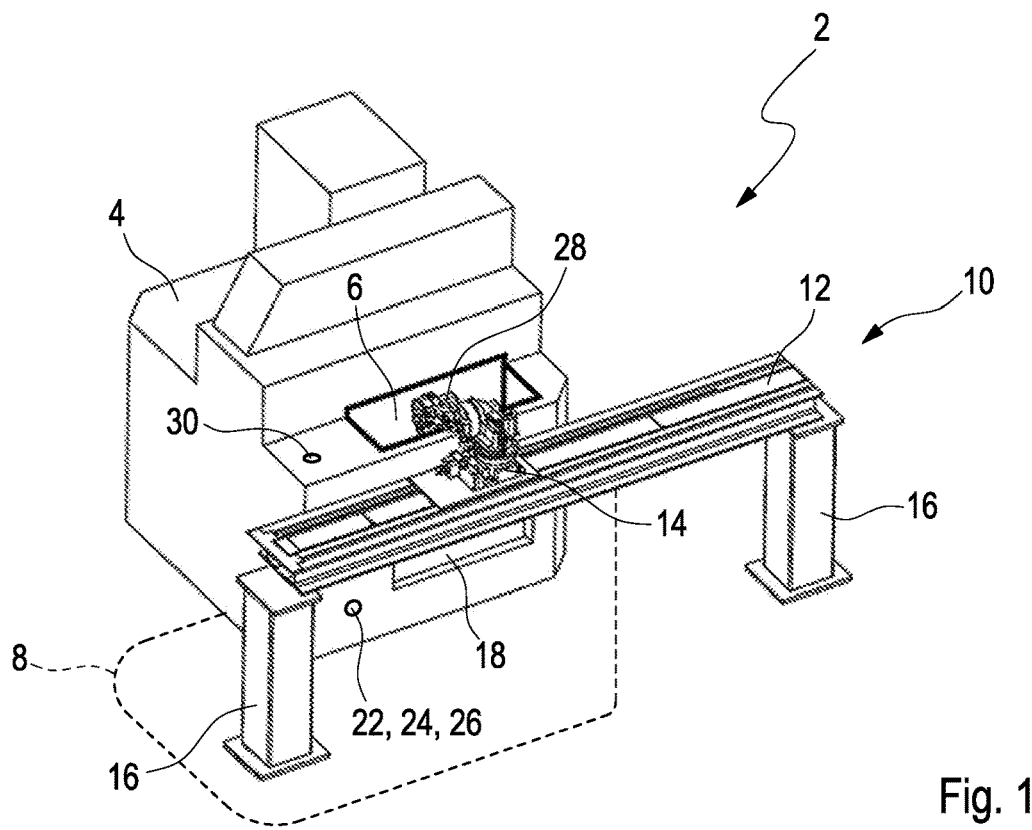
FIG. 1 A perspective side view of a workpiece machining system with a loading and unloading device in an engaged position of a gripping arm.
Figure 2:
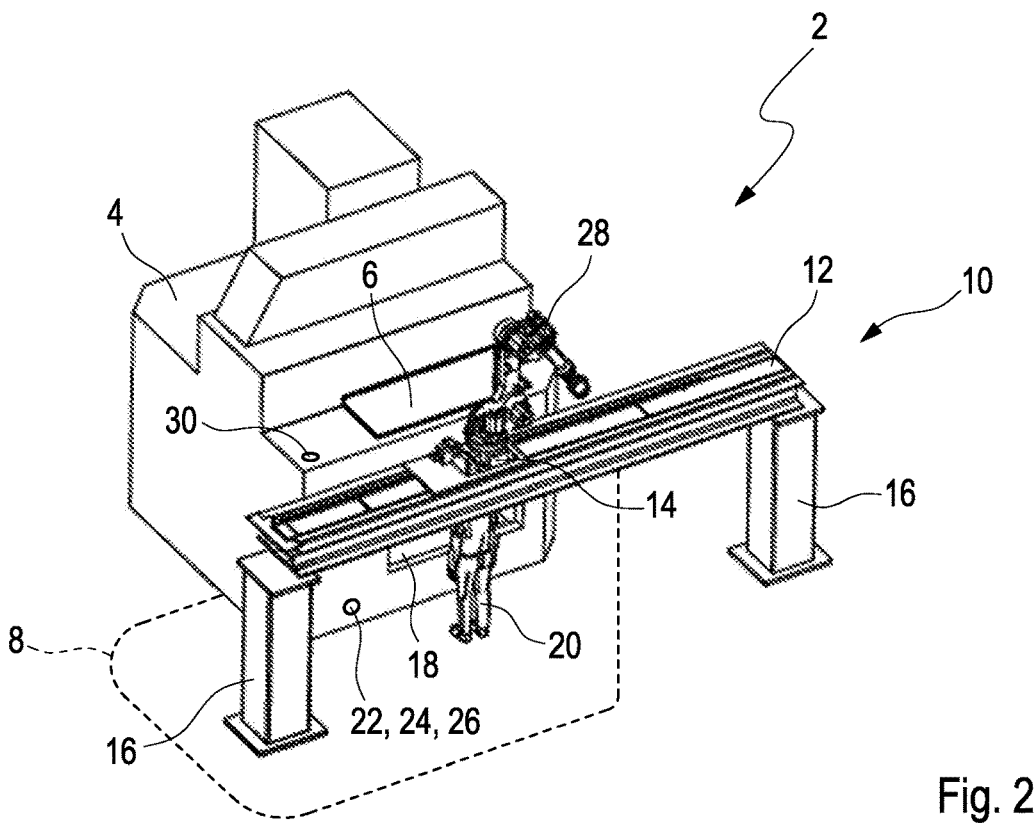
FIG. 2 A perspective preview of the workpiece machining system according to FIG. 1 while detecting a safety-relevant event.

FIGS. 1 and 2 show a workpiece machining system provided overall with the reference numeral 2. This comprises at least one machine tool 4, which comprises at least one loading and unloading opening 6 and a security area 8.

In addition, the workpiece machining system 2 comprises a loading and unloading device 10, which has a carrier 12 and a multi-axis loading and unloading device 14 embodied as a robot. With the embodiment shown in FIGS. 1 and 2, the Loading and unloading device is spaced from a floor and the carriers 12 arranged on supports 16. By the arrangement of the carrier 12 on the supports, 16 an operator's access 18 of the machine tool 4 is accessible to a person 20.

In addition, the machine tool 4 comprises a first sensor means 22 with which the safety area 8 is monitorable. The first sensor means 22 is part of a safety device 24 which comprises in addition to the first sensor means 22 a control unit 26 with which the data of the first sensor means 22 are detectable and evaluateable and the loading and unloading device 10 is selectable.

FIG. 1 shows the workpiece machining system 2 for which no safety-relevant event is ascertained. The multi-axis loading and unloading device 14 is in a loading and unloading position before the machine tool 4 and intervenes in the machine tool 4 with a gripping arm 28 through the loading and unloading opening 6 of the machine tool 4. With the gripping arm 28, for example, work pieces, tools or such can be added or removed in the interior of the machine tool 4.

FIG. 2 shows the workpiece machining system 2 for which a safety-relevant event was ascertained. The safety-relevant event according to FIG. 2 concerns the penetration of a person 20 into the safety area 8 of the machine tool 4.

The multi-axis loading and unloading device 14 is still in the loading and unloading position before the machine tool 4. However, the gripping arm 28 was automatically transferred, by the safety device 24, in particular the control unit 26, from an engagement position, in which the gripping arm 28 protrudes laterally beyond the carrier 12 and in particular is immersed in the loading and unloading opening 6 of the machine tool 4, to a movement position in which the gripping arm 28 is arranged essentially above the carrier 12 of the loading and unloading device 10.

With the help of the FIGS. 3 to 4, a method for operating a workpiece machining system 2 will be explained below.

In the first step 101, a safety-relevant event is deposited or is defined if necessary in the control unit 26. On this occasion, the safety-relevant event can concern an opened functional position of the operator's access 18, transferring the operator's access 18 from a closed functional position to an opened functional position and/or a penetration of a body 20 into the safety area 8 of the machine tool 4.

In a step 102, the safety area 8 is monitored by the first sensor means 22 of the safety device 24.

In a possible further step 103, the position the multi-axis loading and unloading device 14 is detected by the control unit 26. This can occur, for example, through the second sensor means 30 of the safety device 24.

In a subsequent step 104, a safety-relevant event defined, deposited or depositable in the control unit 26 in the safety area 8 of the machine tool 4 is detected by the first sensor means 22. Transferring the gripping arm 28 of the multi-axis loading and unloading device 14 from the movement position according to FIG. 2 in the engagement position according to FIG. 1 is blocked by detecting the safety-relevant event, and/or a gripping arm 28 which is in the engagement position according to FIG. 1 is transferred from the engagement position in the movement position by the control unit 26.

Monitoring the safety area 8 of the machine tool 4 occurs through the first sensor means 22. This can concern, for example, an opened functional position of the operator's access 18, transferring the operator's access 18 from a closed functional position to an opened functional position and/or and/or an approximation of a body 20 to the machine tool 4, in particular in the security area 8 of the machine tool 4.

Figure 3:
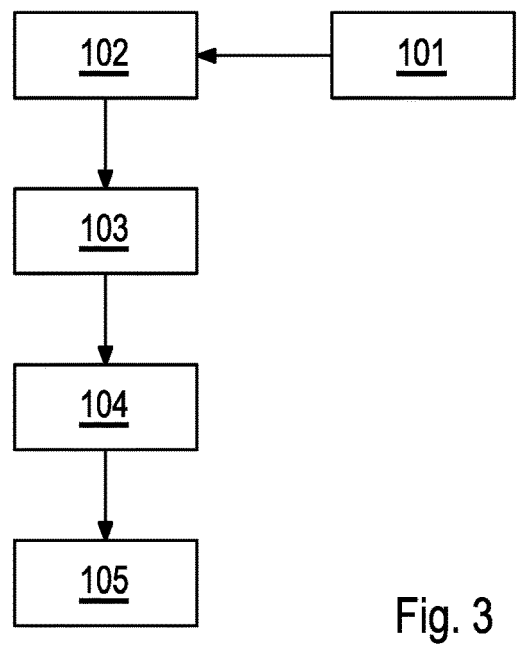
FIG. 3 A schematic flow diagram of a first embodiment example of the method.
Figure 4:
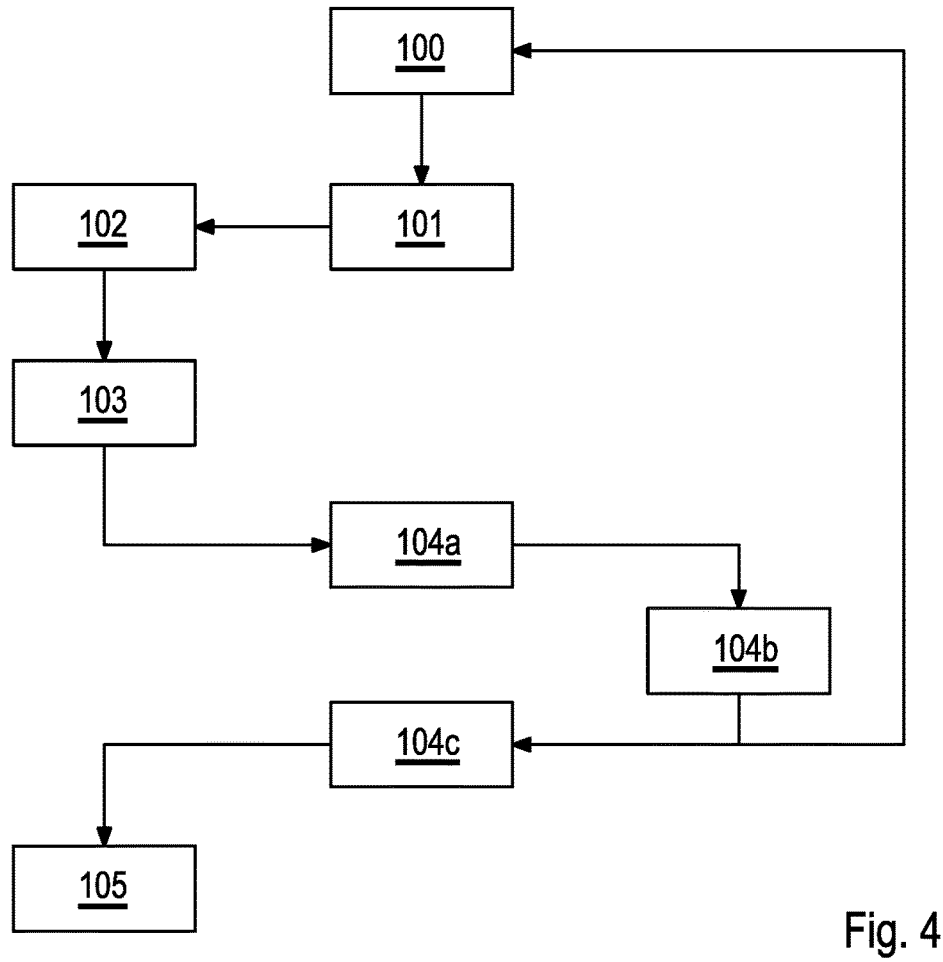
FIG. 4 A schematic flow diagram of a supplement of the method according to FIG. 3.

FIG. 4 shows a development of the method according to FIG. 3 and dissects the method step 104 according to FIG. 3 into several intermediate steps.

In a possibly envisaged step 100 which is concurrent or upstream to or of the step 101, a date or several dates is or are deposited or defined in the control unit 26 which serves, for example, the differentiation of objects and people 20 by the control unit 26 and comprises in particular body forms and/or body contours.

After the step 103 according to FIG. 3, approximating of a body 20 to the machine tool 4, in particular in the safety area 8 of the machine tool 4, is detected in a step 104a by the first sensor means 22. In a directly following step 104b, the body 20 is analysed by the control unit 26 and the differentiation of the body is ascertained and is recognised as an object or as a person 20.

If it is determined in step 104b that the body 20 concerns an object, no safety-relevant event is present. Then the method jumps back to step 100. However, if it is determined that the body concerns a person 20, it is determined in a step 104c that it concerns a safety-relevant event and this event is established. The method continues in such a case with step 105.

Figure 5:
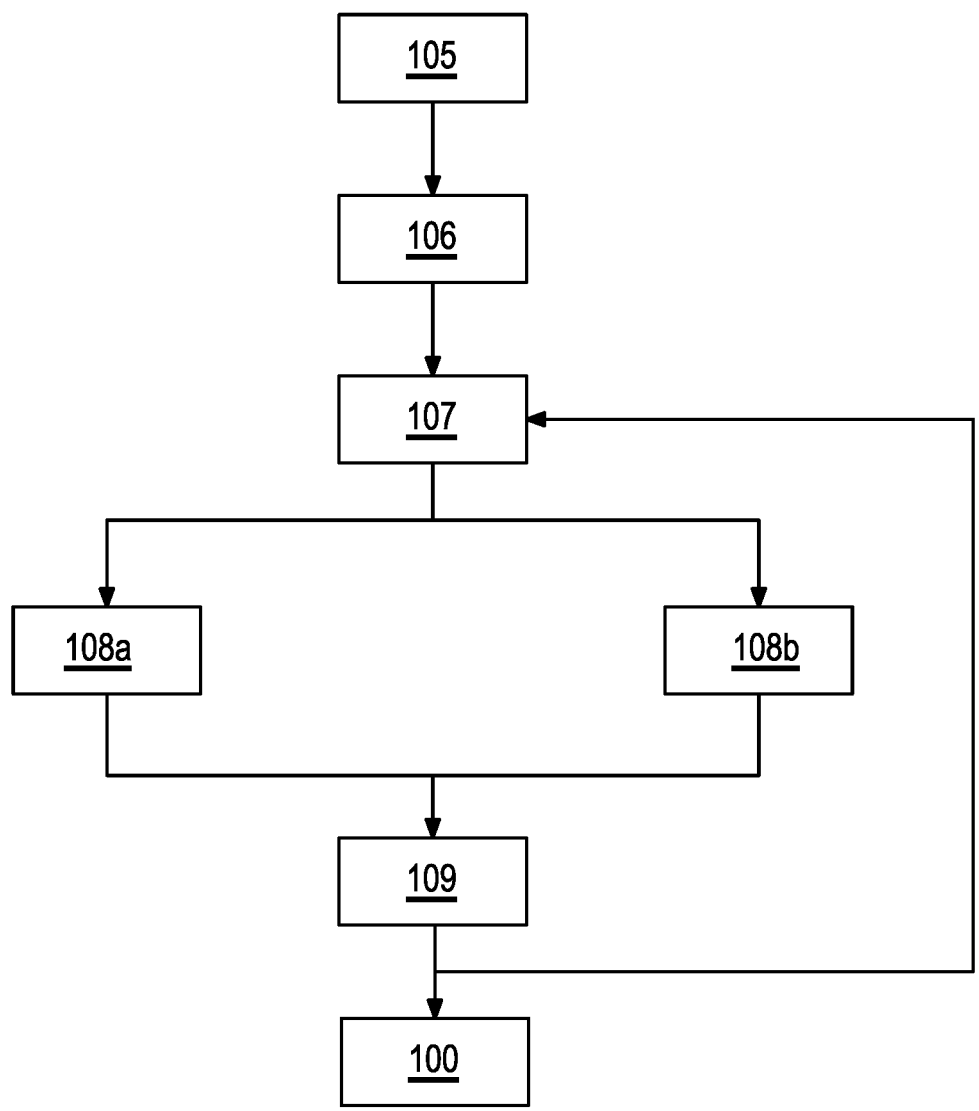
FIG. 5 A schematic flow diagram of an embodiment of supplementary method steps for the method according to FIG. 3.

FIG. 5 shows an embodiment of the method according to FIG. 3 with which further method steps connect afterwards to step 105. In a step 106, machining processes of the multi-axis loading and unloading device 14 deposited in the control unit 26 are interrupted on the machine tool 4 on which the safety-relevant event is detected.

In a subsequent step 107, it is determined whether a machining process deposited in the control unit 26 of the multi-axis loading and unloading device 14 can be continued on a machine tool 4 on which no safety-relevant event is ascertained. If a machine tool 4 is detected by the control unit 26 on which no safety-relevant event is ascertained and on which a machining process deposited in the control unit 26 can be executed, the multi-axis loading and unloading device 14 is moved to this machine tool 4 in a step 108a.

If no machine tool 4 is determined, however, on which no safety-relevant event is ascertained and/or on which no machining process deposited in the control unit can be executed, the multi-axis loading and unloading device 14 is moved into a parking position in a step 108b.

In step 108a, the multi-axis loading and unloading device 14 continues a processing operation associated with the machine tool 4 as soon as it has reached the loading and unloading position there.

In a subsequent step 109, which follows both steps 108a and 108b, it is checked continuously whether the safety-relevant event ascertained on the machine tool 4 is finished and whether the interrupted machining process can be continued.

If there is still the safety-relevant event on the machine tool 4 at which the safety-relevant event was detected, the method jumps back to step 107 and detects once more whether a machining process of the multi-axis loading and unloading device 14 deposited in the control unit 26 can be continued on a machine tool 4 on which no safety-relevant event is ascertained. However, if it is determined in step 109 that the safety-relevant event does not exist on the machine tool 4 anymore, the method returns to step 100.

The features of the invention disclosed in the foregoing description, in the claims and in the diagrams, may be essential both individually and in any combination in the implementation of the invention in its various embodiments.

REFERENCE LIST 2 workpiece machining system
4 Machine tool
6 Loading and unloading opening
8 security area
10 Loading and unloading equipment
12 Carrier
14 Loading and unloading device
16 supports
18 Operator Access
20 Body, person
22 First sensor tool
24 Safety device
26 control unit
28 gripper arm
30 Second sensor tool
100-109 method steps

The invention claimed is:

1. A method for operating a workpiece machining system, which comprises at least one machine tool, which has at least one loading and unloading opening and at least one safety area, which has at least one loading and unloading device, which has at least one carrier and at least one multi-axis loading and unloading device which is configured to move along the at least one carrier and, wherein the at least one multi-axis loading and unloading device is able to be arranged in front of the at least one machine tool in a loading and unloading position and at least one gripping arm of the at least one multi-axis loading and unloading device is configured to move from a displacement position, in which the at least one gripping arm is arranged substantially above the at least one carrier, into an engagement position, in which the at least one gripping arm protrudes laterally beyond the at least one carrier and in particular is arranged in or above the at least one loading and unloading opening of the at least one machine tool, and includes at least one safety device for monitoring the at least one safety area of the at least one machine tool which has at least one control unit functionally assigned or attributable to the at least one loading and unloading device and at least one first sensor means, arranged in or on the at least one safety area, comprising the steps:

storing and/or defining of at least of one safety-relevant event in the at least one control unit;

monitoring the at least one safety area of the at least one machine tool by the at least one first sensor means of the at least one safety device;

detecting of the position of the at least one multi-axis loading and unloading device, directly or indirectly, by the at least one control unit;

detecting if the at least one safety-relevant event that is defined and/or stored in the at least one control unit occurs in the at least one safety area of the at least one machine tool by the at least one first sensor means;

where, if the at least one safety-relevant event is detected, blocking a transfer of the at least one gripping arm of the at least one multi-axis loading and unloading device from the displacement position to the engagement position when the at least one gripping arm is in the displacement position and/or transferring the at least one gripping arm of the at least one multi-axis loading and unloading device from the engagement position to the displacement position when the at least one gripping arm is in the engagement position.

2. The method according to claim 1, wherein the at least one safety-related event defined or stored in the control unit, comprises at least one open functional position of an operator access of the at least one machine tool, a transferring of the operator access from a closed functional position to the open functional position and/or penetration of a body into the at least one safety area of the at least one machine tool.

3. The method according to claim 1, wherein the monitoring of the at least one safety area of the at least one machine tool by the at least one first sensor means of the at least one safety device comprises detecting a closed functional position or open functional position of an operator access of the at least one machine tool and/or detecting an approach of a body to the at least one machine tool, in particular towards the at least one safety area of the at least one machine tool.

4. The method according to claim 3, further comprising the steps:
storing and/or defining data, in particular body shapes and/or body contours, in the at least one control unit for distinguishing between objects and persons by the at least one control unit;
detecting an approach of the body to the at least one machine tool, in particular into the at least one safety area of the at least one machine tool, by the at least one first sensor means;
analysing of the body by the at least one control unit and detecting and recognizing the sensed body as an object or as a person;
determining that a safety-relevant event occurs at least if the body comprises a person.

5. The method according to claim 1, wherein detecting the position of the at least one multi-axis loading and unloading device occurs through at least a second sensor means of the at least one safety device by which at least a distance is detected from the at least one multi-axis loading and unloading device to the at least one machine tool, where the at least one safety-relevant event is determined.

6. The method according to claim 1, wherein when the at least one safety-relevant event is detected, moving the at least one multi-axis loading and unloading device from the loading and unloading position in front of the at least one machine where the safety-relevant event is detected.

7. The method according to claim 6, wherein:
interruption of machining operations of the at least one multi-axis loading and unloading device when the at least one safety-relevant event is detected, wherein the machining operations are stored in the at least one control unit;
determining whether an at least one machining operation stored in the at least one control unit in which no safety-relevant event is determined, is able to be continued;
moving the at least one multi-axis loading and unloading device to a machine tool in which no safety-relevant event is determined, and on which a machining operation stored on the control unit is able to be executed; or
moving the at least one multi-axis loading and unloading device to a park position, if the at least one safety-relevant event is determined on every at least one machine tool, and/or on which no machining operation stored on the control unit is able to be executed;
checking continuously whether the at least one safety-related event detected on the at least one machine tool has ended and whether the interrupted machining operation is able to be continued.

8. A workpiece machining system, that is operable by a method according to claim 1 with at least one machine tool, which has at least one loading and unloading opening and at least one safety area, which has at least one loading and unloading device, which has at least one carrier and at least one multi-axis loading and unloading device which is configured to move along the at least one carrier and, wherein the at least one multi-axis loading and unloading device is able to be arranged in front of the at least one machine tool in a loading and unloading position and at least one gripping arm of the at least one multi-axis loading and unloading device is configured to move from a displacement position, in which the at least one gripping arm is arranged substantially above the at least one carrier, into an engagement position, in which the at least one gripping arm protrudes laterally beyond the at least one carrier and in particular is arranged in or above the at least one loading and unloading opening of the at least one machine tool, and with at least one safety device for monitoring the at least one safety area of the at least one machine tool which has at least one control unit functionally assigned or attributable to the at least one multi-axis loading and unloading device and at least one first sensor means, arranged in or on the at least one safety area,
wherein the at least one control unit is configured so that:
at least of one safety-relevant event is stored and/or defined in the at least one control unit;
the at least one safety area of the at least one machine tool is monitored by the at least one first sensor means of the at least one safety device;
the position of the at least one multi-axis loading and unloading device is detected, directly or indirectly, by the at least one control unit;
detecting if the at least one safety-relevant event that is defined and/or stored in the at least one control unit occurs in the at least one safety area of the at least one machine tool by the at least one first sensor means;
where, if the at least one safety-relevant event is determined, blocking a transfer of the at least one gripping arm of the at least one multi-axis loading and unloading device from the displacement position to the engagement position when the at least one gripping arm is in the displacement position and/or transferring the at least one gripping arm of the at least one multi-axis loading and unloading device from the engagement position to the displacement position when the at least one gripping arm is in the engagement position.

9. The workpiece machining system according to claim 8, wherein the at least one first sensor means of the at least one safety device comprises at least one motion sensor, rangefinder or toggle switch of an operator access of the at least one machine tool.

10. The workpiece machining system according to claim 8, wherein the at least one safety device comprises at least a second sensor means by which a distance of the at least one multi-axis loading and unloading device to the at least one machine tool is able to be detected and which comprises a rangefinder and/or a motor position of a drive of the at least one multi-axis loading and unloading device.

11. The workpiece machining system according to claim 9, wherein the at least one safety device comprises at least a second sensor means by which a distance of the at least one multi-axis loading and unloading device to the at least one machine tool is able to be detected and which comprises a rangefinder and/or a motor position of a drive of the at least one multi-axis loading and unloading device.

12. The method according to claim 2, wherein the monitoring of the at least one safety area of the at least one machine tool by the at least one first sensor means of the at least one safety device comprises detecting a closed functional position or open functional position of the operator access of the at least one machine tool and/or detecting an approach of a body to the at least one machine tool, in particular towards the at least one safety area of the at least one machine tool.

* * * * *